May 2, 1967  M. S. RINALDO  3,316,665
SNOWPLOW BLADE FOR AUTOMOBILE BUMPER MOUNTING
Filed April 28, 1964  2 Sheets-Sheet 1
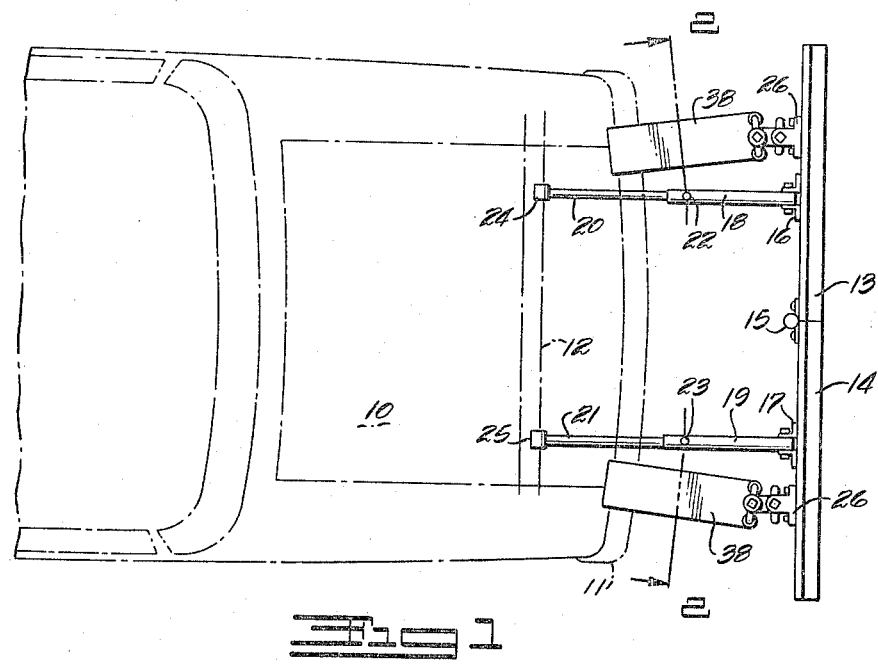
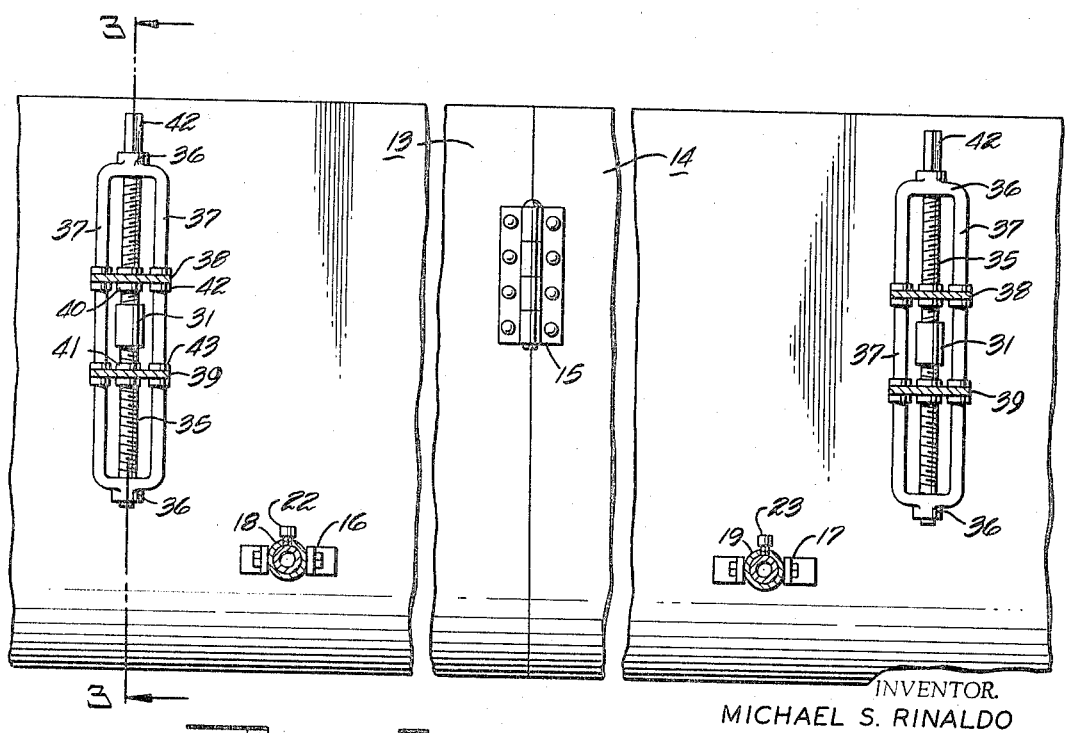
INVENTOR.
MICHAEL S. RINALDO
BY W. B. Hauptman
ATTORNEY

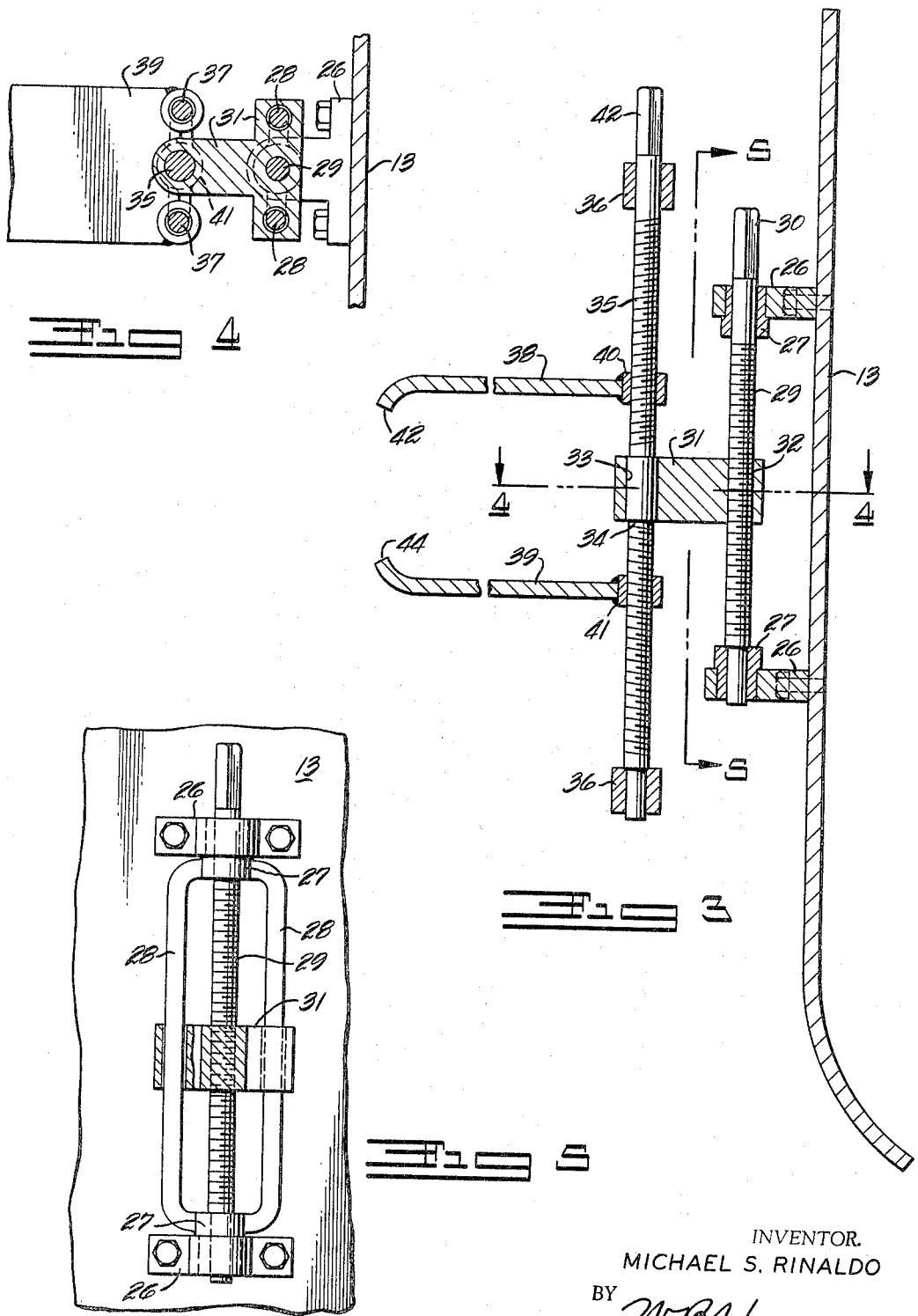

United States Patent Office 3,316,665
Patented May 2, 1967

3,316,665
SNOWPLOW BLADE FOR AUTOMOBILE BUMPER MOUNTING
Michael S. Rinaldo, 1921 Sequoya Drive,
Poland, Ohio 44514
Filed Apr. 28, 1964, Ser. No. 363,239
3 Claims. (Cl. 37—42)

This invention relates to a snowplow blade and more particularly to a portable light-weight snowplow attachment for an automobile.

The principal object of the invention is the provision of a portable snowplow blade that may be clamped to an automobile bumper and adjusted vertically and horizontally relative to the automobile bumper so as to be effective with respect to a surface to be plowed.

A further object of the invention is the provision of a snowplow blade for mounting on an automobile bumper and which blade includes novel adjustment and clamping means.

A further object of the invention is the provision of a snowplow blade that will mount on any automobile bumper regardless of the height of the bumper or the thickness thereof or its relative position with respect to the driveway or other surface to be cleared of snow.

A still further object of the invention is the provision of a portable snowplow blade that may be folded in the middle and conveniently carried in the trunk of the automobile or stored in a small space in the garage in which the automobile is normally placed.

The snowplow blade disclosed herein comprises an improvement in portable snowplow blades and means for attaching them to automobiles and particularly to automobile bumpers. The blade disclosed herein comprises a pair of sheet metal stampings of sufficient gauge to be usable as a snowplow blade with the pair of blades hinged to one another so that they can be folded for storage, or opened for use. The blade incorporates novel mounting brackets on the rear surface thereof by means of which the clamps which are carried on the mounting brackets are adjustable vertically and the clamps themselves are novel constructions, which will engage and suitably hold the snowplow blade on any size or shape of bumper at any height relative to the surface of the plow.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a top plan view of the snowplow blade and mounting means with broken lines indicating a portion of an automobile.

FIGURE 2 is a horizontal section on line 2—2 of FIGURE 1 in enlarged detail with parts broken away and parts in cross section.

FIGURE 3 is an enlarged vertical section on line 3—3 of FIGURE 2 with parts broken away and parts in cross section.

FIGURE 4 is a horizontal section on line 4—4 of FIGURE 3 with parts broken away and parts in cross section.

FIGURE 5 is a vertical section on line 5—5 of FIGURE 3 with parts broken away and parts in cross section.

By referring to the drawings and FIGURE 1 in particular, it will be seen that a snowplow blade has been disclosed which may be clampingly affixed to an automobile bumper, such as the front bumper. In FIGURE 1 of the drawings, the automobile, or a portion thereof, is shown in broken lines and indicated generally by the numeral 10 and a front bumper 11 thereof is also illustrated, as is a transverse frame member 12. The snowplow blade comprises two identical half sections 13 and 14 hinged to one another at their adjacent abutting edges by a hinge 15 as best seen in enlarged detail in FIGURE 2 of the drawings. Each of the snowplow blade sections 13 and 14 has two pairs of mounting brackets secured thereto, the centermost pair being indicated by the numerals 16 and 17 respectively and serve to pivotally mount the forward ends of tubular arms 18 and 19 respectively, which have telescopically extensible members 20 and 21 respectively secured therein by set screws 22 and 23, again as best seen in FIGURE 2 of the drawings. The innermost ends of the telescopic extensions 20 and 21 have U-shaped brackets 24 and 25 thereon so that they may be engaged over a transverse frame member such as the frame member 12 as seen in FIGURE 1 of the drawings and which lies beneath the body and the bumper assembly of the automobile, as will be understood by those skilled in the art.

Each of the snowplow blade sections 13 and 14 has an outer pair of mounting brackets which are generally indicated at 26, 26 and which actually comprise two vertically spaced brackets 26, 26 secured to each of the snow blade sections 13 and 14, as best seen in FIGURES 3, 4 and 5 of the drawings. The brackets 26, 26 attached to each of the snow blade sections 13 and 14 have vertical apertures in which the upper and lower ends of yokes 27, 27 are journalled and which yokes 27, 27 each have a pair of spaced vertically positioned rods 28, 28. A threaded shaft 29 is positioned through vertical openings in the upper and lower ends of the yokes 27, 27 and has an upward extension 30 which is square so that it may be revolved by a wrench removably fitted thereon. A connecting body member 31 having spaced vertical openings 32 and 33 therein with the opening 32 being threaded and engaged on the threaded shaft 29 is provided on each of the assemblies, as described, so as to enable it to provide vertical adjustment relative to the snow blade portion 13 or 14 as the case may be. Each connecting body member 31 also has spaced vertical openings slidably engaging said rods 28, 28, of the yokes 27, 27.

Still referring to FIGURES 3, 4 and 5 of the drawings, it will be seen that the connecting body member 31 has its outermost aperture unthreaded and journalled on an unthreaded portion 34 of a secondary threaded shaft 35 which has upper and lower spaced oppositely threaded sections thereon. The secondary threaded shaft 35 is rotatably positioned at its upper and lower ends through apertures in secondary yokes 36, 36, as best seen in FIGURES 2 and 3 of the drawings and which secondary yokes are spaced vertically and interconnected by a pair of parallel secondary rods 37, 37. A pair of vertically spaced clamping arms 38 and 39 have enlarged end sections 40 and 41 respectively, which are provided with vertically positioned threaded apertures which are engaged on the upper and lower oppositely threaded sections of the secondary threaded shaft 35 as heretofore described. Additional spaced apertures in enlarged sections 42 and 43 respectively engage the spaced parallel secondary guide rods 37, 37 so that each of the clamping arms 38 and 39 is held by the guide rods 37, 37 and the threaded shaft 35 which in turn is held by the connecting body member 31 on the threaded shaft 29. The upper end of the secondary threaded shaft 35 is squared as at 42, and the outer ends of each of the clamping arms 38 and 39 are curved toward one another as indicated at 43 and 44 respectively.

It will thus be seen that each of the snow blade sections 13 and 14 are provided with adjustable clamping assemblies including the clamping arms 38 and 39, and there are two pairs of these, so that each of the blade sections 13 and 14 may be securely attached to the supporting bumper of the automobile and held in that position by the tubular arms 18 and 19 and their telescopic members 20 and 21, as heretofore referred to.

It will be observed that by rotating each of the threaded shafts 29, the blade sections 13 and 14 may be moved vertically relative to the bumper 11 on the automobile on which the device is to be attached, and that by moving each of the secondary threaded shafts 35 the clamping arms 39, and there are two pairs of these, may be moved toward one another to clampingly engage the bumper 11 of the automobile to which the portable snow blade is attached.

It will occur to those skilled in the art that the clamping arms 38 and 39 may be provided with transverse ribs on their opposed surfaces, if desired, so that any size, shape or contour of bumper may be readily engaged thereby.

It will thus be seen that a novel construction of a portable snowplow blade for an automobile bumper has been disclosed which comprises the sections 13 and 14 which are normally hinged together so that they may be folded to form a compact package. In use, the sections are in end-to-end relation as shown in FIGURES 1 and 2 of the drawings and may be conveniently and easily attached to the automobile bumper and the tubular arms 18 and 19 used to engage a portion of the undercarriage of the automobile, such as the transverse frame member 12, as shown in FIGURE 1 so that the snowplow may be firmly and effectively held at the desired height and is therefore usable for the indicated purpose.

It will thus be seen that a portable snowplow blade meeting the several objects of the invention has been disclosed, and having thus described my invention, what I claim is:

1. A snowplow attachment for an automobile having a bumper and a transverse frame member therebehind, said snowplow attachment comprising a pair of blade portions hinged to one another in endwise relation, means on each of said blade portions vertically mounting a pair of threaded rods, said means including a connecting body member joining said rods, one of said rods having upper and lower threaded areas in which the threads are oppositely arranged, apertured clamping arms respectively threadably engaging said upper and lower threaded areas of said rod for engaging said bumper, the other of said threaded rods being threadably engaged with said connecting body member and being journalled on said mounting means for raising and lowering movement of said blade relative to said connecting body member, and secondary extensible means on each blade portion for engaging said transverse frame member.

2. A snowplow attachment for an automobile set forth in claim 1 and wherein said means on said blade portions mounting said other of said rods include upper and lower yoke members with interconnecting shafts parallel with said rods and wherein said connecting body is apertured and slidably engaged on the shafts.

3. A snowplow attachment for an automobile as set forth in claim 2 wherein second upper and lower yoke members with interconnecting shafts are journalled on said one of said rods and wherein said clamping arms are provided with apertures which slidably engage the interconnecting shafts of said second yoke members.

References Cited by the Examiner

UNITED STATES PATENTS

| 2,141,558 | 12/1938 | Richter | 37—42 |
| 2,231,268 | 2/1941 | Hoare | 37—42 X |
| 2,333,360 | 11/1943 | Churchill | 37—44 |
| 2,575,091 | 11/1951 | Borgeson | 37—44 |
| 2,582,136 | 1/1952 | Koblas | 37—44 |
| 3,098,309 | 7/1963 | Koch | 37—42 |

ABRAHAM G. STONE, *Primary Examiner.*

R. L. HOLLISTER, *Assistant Examiner.*